(12) United States Patent
Kinnear, Jr. et al.

(10) Patent No.: US 7,139,818 B1
(45) Date of Patent: Nov. 21, 2006

(54) TECHNIQUES FOR DYNAMIC HOST CONFIGURATION WITHOUT DIRECT COMMUNICATIONS BETWEEN CLIENT AND SERVER

(75) Inventors: Kenneth Kinnear, Jr., Boxborough, MA (US); Mark Stapp, Belmont, MA (US); Richard Johnson, Santa Barbara, CA (US)

(73) Assignee: Cisco Technology, Inc., San Jose, CA (US)

(*) Notice: Subject to any disclaimer, the term of this patent is extended or adjusted under 35 U.S.C. 154(b) by 656 days.

(21) Appl. No.: 09/972,139

(22) Filed: Oct. 4, 2001

(51) Int. Cl.
G06F 15/177 (2006.01)

(52) U.S. Cl. .................. 709/222; 709/226; 709/244

(58) Field of Classification Search .......... 709/220, 709/227, 222, 238, 218, 221, 228, 226, 244, 709/229; 713/201; 370/401, 466, 490, 458, 370/356, 395, 493, 516, 352; 725/111; 455/435
See application file for complete search history.

(56) References Cited

U.S. PATENT DOCUMENTS

| | | | |
|---|---|---|---|
| 5,790,548 A | 8/1998 | Sistanizadeh et al. | |
| 5,835,723 A | 11/1998 | Andrews et al. | |
| 5,848,233 A * | 12/1998 | Radia et al. .............. | 713/201 |
| 5,884,024 A * | 3/1999 | Lim et al. ................ | 713/201 |
| 5,987,524 A | 11/1999 | Yoshida et al. | |
| 6,009,103 A * | 12/1999 | Woundy ................. | 370/401 |
| 6,023,724 A * | 2/2000 | Bhatia et al. ............ | 709/218 |
| 6,065,055 A * | 5/2000 | Hughes et al. .......... | 709/229 |
| 6,078,582 A * | 6/2000 | Curry et al. ............. | 370/356 |
| 6,151,631 A | 11/2000 | Ansell et al. | |
| 6,154,465 A * | 11/2000 | Pickett .................... | 370/466 |
| 6,172,986 B1 | 1/2001 | Watanuki et al. | |
| 6,178,455 B1 * | 1/2001 | Schutte et al. .......... | 709/228 |
| 6,219,697 B1 * | 4/2001 | Lawande et al. ........ | 709/221 |
| 6,266,341 B1 * | 7/2001 | Surprenant et al. .... | 370/458 |
| 6,289,025 B1 * | 9/2001 | Pang et al. .............. | 370/458 |
| 6,343,324 B1 | 1/2002 | Hubis et al. | |
| 6,389,472 B1 * | 5/2002 | Hughes et al. .......... | 709/229 |
| 6,393,484 B1 * | 5/2002 | Massarani ............... | 709/227 |
| 6,396,849 B1 * | 5/2002 | Sarkissian et al. ...... | 370/490 |
| 6,405,251 B1 | 6/2002 | Bullard et al. | |
| 6,424,659 B1 | 7/2002 | Viswanadham et al. | |
| 6,425,003 B1 | 7/2002 | Herzog et al. .......... | 709/223 |
| 6,427,170 B1 * | 7/2002 | Sitaraman et al. ...... | 709/226 |

(Continued)

OTHER PUBLICATIONS

A Caching DHCP Relay Agent—Fry, Knight ; www.cs.rpi.edu/tr/97-10.ps.*

(Continued)

Primary Examiner—Thong Vu
(74) Attorney, Agent, or Firm—Hickman Palermo Truong & Becker LLP

(57) ABSTRACT

A method for providing leased network addresses for a host from a server executing on a server device is disclosed. A first request for a leased network address from the host, relayed by an intermediate device, is received. The intermediate device filters communications between the host and the server device. A response is generated for the host, by the server, which offers a leased network address for a particular period of time and includes a network address of the intermediate device. The network address of the intermediate device is provided in a portion of the response normally designated for indicating a network address of the server. By providing the address of the intermediate device in the portion of the response designated for the server address, the server causes the client to send renewal requests to the intermediate device so that a relay process on the intermediate device can properly operate on the request, without modifying the client process.

29 Claims, 7 Drawing Sheets

U.S. PATENT DOCUMENTS

| | | | |
|---|---|---|---|
| 6,515,974 B1 | 2/2003 | Inoue et al. | |
| 6,578,074 B1* | 6/2003 | Bahlmann | 709/220 |
| 6,598,057 B1 | 7/2003 | Synnestvedt et al. | 707/200 |
| 6,678,732 B1 | 1/2004 | Mouko et al. | |
| 6,754,492 B1* | 6/2004 | Stammers et al. | 455/435.1 |
| 6,765,931 B1* | 7/2004 | Rabenko et al. | 370/493 |
| 6,801,507 B1 | 10/2004 | Humpleman et al. | 370/257 |
| 6,817,519 B1 | 11/2004 | Yasushi et al. | |
| 6,826,611 B1 | 11/2004 | Arndt | |
| 6,829,235 B1 | 12/2004 | Musiol | |
| 6,845,094 B1 | 1/2005 | Zhang | |
| 6,871,346 B1 | 3/2005 | Kumbalimutt et al. | |
| 6,901,073 B1* | 5/2005 | Wright et al. | 370/395.5 |
| 6,907,470 B1* | 6/2005 | Sawada et al. | 709/244 |
| 6,973,102 B1* | 12/2005 | Karagiannis et al. | 370/516 |
| 2002/0016858 A1* | 2/2002 | Sawada et al. | 709/238 |
| 2002/0062485 A1* | 5/2002 | Okano et al. | 725/111 |
| 2002/0141390 A1* | 10/2002 | Fangman et al. | 370/352 |
| 2003/0001883 A1 | 1/2003 | Wang | 345/736 |
| 2003/0009537 A1 | 1/2003 | Wang | 709/219 |
| 2003/0069948 A1* | 4/2003 | Ma et al. | 709/220 |
| 2003/0093187 A1 | 5/2003 | Walker | 701/1 |

OTHER PUBLICATIONS

Using Leases to Support Server-Driven Consistency in..—Jian Yin Lorenzo (1998) ; www.cs.utexas.edu/users/yin/papers/icdcs98.ps.*

Nomadic Metacomputing—Fry ; www.cs.rpi.edu/~fryp/papers/candidacy/proposal.ps.*

Primarily Disconnected Operation: Experiences with Ficus—Heidemann (1992) ftp.cs.ucla.edu/pub/ficus/WorkMgtReplData_92.ps.gz.*

A Network-Conscious Approach to End-to-End Video Delivery..—Wang, Zhang, Du, Su (1998) www.cs/umn/edu/~zhzhang/Papers/Wang98:Network.ps.*

Video Staging: A Proxy-Server-Based Approach to End-to-End..—Zhi-Li Zhang Yuewei. (2000) www.cs.umn.edu/~zhzhang/Papers/Zhan00:Video-Staging.ps.*

"Network Address Translators (NATs) Can Block Netlogon Traffic (Q172227)," Microsoft Product Support Services article, Microsoft Corporation, Aug. 10, 2001.

Anonymous, IETF Network Working Group, Protocol Standard For A NetBIOS Service On A TCP/UDP Transport: Concepts And Methods, Request for Comments 1001, Mar. 1987.

R. Droms, "Dynamic Host Configuration Protocol," IETF Network Working Group, Request for Comments 2131, Mar. 1997.

S. Alexander et al., "DHCP Options and BOOTP Vendor Extensions," IETF Network Working Group, Request for Comments 2132, Mar. 1997.

P. Srisuresh et al., "Traditional IP Network Address Translator (Traditional NAT)," IETF Network Working Group Request for Comments 3022, Jan. 2001.

LANutil 32 Suite User Manual located on the internet at <http://www.vector-networks.com/luvms/manual/lup020.htm>, retrieved on Jul. 14, 2005, 8 pages.

TCPware Installation & Configuration Guide Customizing Configuration, located on the internet at <http://vms.process.com/tcpware/iccuconf.htm>, retrieved on Jul. 14, 2005, 15 pages.

Qualifier(s), located on the internet at <http://nssdc.gsfc.nasa.gov/cdf/manual/nodel140.html>, retrieved from the internet on Jul. 14, 2005, 2 pages.

Handley, M., "Multicast Address Alloctation Protocol (AAP)," Internet Draft, Dec. 15, 1997, www.aciri.org/malloc/draft-handley-aap-00.ps. pp. 1-11.

Rosen, E., "BGP/MPLS VPNs," Cisco Systems, Mar. 1999, Network Working Group Request for Comments: 2547, www.tzi.de/~cabo/pdfrfc/rfc2547.txt.pdf, pp. 1-25.

March, Brian D. et al., "First-Class User-Level Threads," Computer Science Department, university of Rochester, www.informatik.hu-berlin.de/~meueller/concur/firstclass.ps.gz, 12 pages.

* cited by examiner

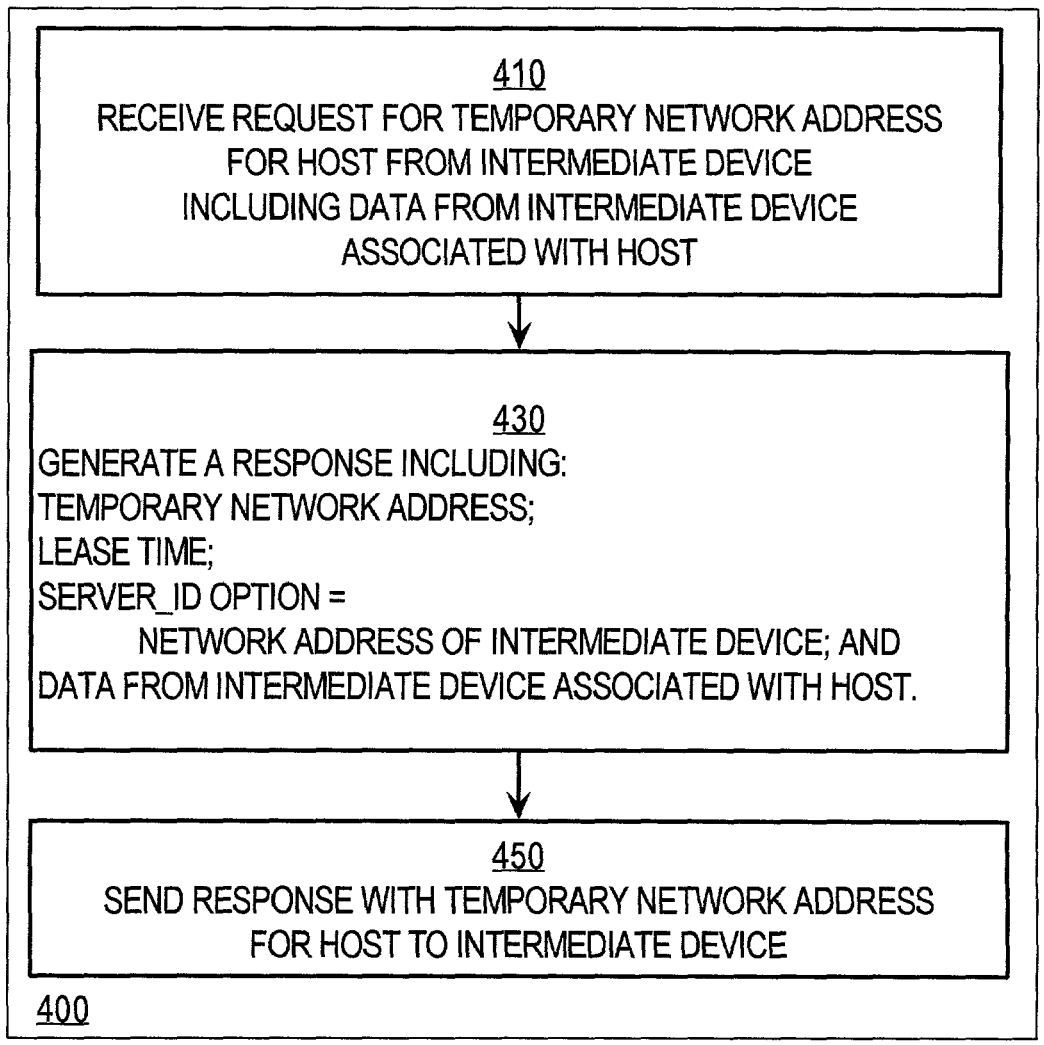

TECHNIQUES FOR DYNAMIC HOST CONFIGURATION WITHOUT DIRECT COMMUNICATIONS BETWEEN CLIENT AND SERVER

FIELD OF INVENTION

The present invention generally relates to dynamic host configuration on a network. The invention relates more specifically to techniques for dynamic host configuration without direct communications between client and server.

BACKGROUND OF THE INVENTION

A computer network includes computer processors or "hosts" that host software applications that provide or request services, or both. The hosts may be network terminals or end stations that do not perform network traffic routing or forwarding functions. The hosts communicate with each other through network devices, such as switches and routers, sometimes called intermediate devices, which do perform routing and forwarding functions. When a host is added to a network by connecting directly to another host, or indirectly to another host through one or more intermediate devices, the host must be configured for network operations. For example, the newly added host is assigned a logical network address for itself, and a network address for the intermediate device that routes or forwards its traffic, among other configuration information.

Computer networks that employ the Transmission Control Protocol and Internet Protocol (TCP/IP) for sending packets of information between devices on the network are proliferating, and as a result, logical network addresses that are used to locate each device on the network have become scarce. Further, in many local networks with many different computers, the number and location of the computers connected to the network may change regularly. In addition, of the many computers physically connected at one time, only a fraction of the computers are on and operating at one time. Thus one or more hosts are being added and dropped frequently.

A specific context in which this problem arises involves large-scale cable modem networks in which voice and other services are delivered over an Internet Protocol network that uses coaxial cable for communications. Addresses are dynamically assigned to cable modems of end users as the users subscribe to and terminate use of service, and to devices that cannot persistently store an address. In this context, it is wasteful to give every device a unique and permanent network address. A number of addresses sufficient for the total anticipated subscriber base can be shared, but configuring each host with a new address is a tedious process to perform manually.

The Dynamic Host Configuration Protocol (DHCP) provides a mechanism through which computers using TCP/IP can obtain network addresses and other configuration information automatically. DHCP is an open standard protocol for dynamic host configuration described in request for comments (RFC) documents numbered 2131 and 2132 available at the time of this writing as rfc2131.txt and rfc2132.txt, respectively, on the worldwide web (www) at domain and directory ietf.org/rfc/. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks. As used hereinafter, a server refers to the server process and a client refers to the client process unless otherwise indicated to refer to the host or device on which the process executes.

When a host begins operations on the local network, the DHCP client on that host requests configuration information from one of the DHCP servers. In response to the request from the DHCP client, one or more of the DHCP servers respond with configuration information to be used by the host of the DHCP client for a predetermined period of time ("lease time"), including an IP address for the host of the DHCP client. Such responses take the form of "offers" of data. The DHCP client notifies the servers that one of the offers is accepted. The host that is executing the DHCP client then uses the configuration information including the address. The configuration information is bound to the particular DHCP client, and the binding is recorded by the DHCP server that offered it.

At a first time, t1, when a substantial portion of the lease time has passed, the DHCP client sends a renewal request to the DHCP server indicating that the lease time should be extended. For example a renewal request may be sent when 75% of the lease time has elapsed. If the DHCP server of the accepted offer does not receive a renewal request from the DHCP client within the lease time, the DHCP server is free to offer that configuration information and IP address to another DHCP client after the lease time expires. If the DHCP client does not receive a response from the DHCP server to a renewal request by a second time, t2, after t1, when almost all of the lease time has passed, such as 95%, the DHCP client sends a rebinding request to all the DHCP servers to provide a new lease for the IP address the DHCP client is currently using.

A DHCP relay agent is a process that executes on an intermediate device to forward DHCP messages between DHCP client and DHCP server. The DHCP relay agent facilitates communications with the DHCP client before the DHCP client's host is bound to a particular IP address. The DHCP relay agent is used when the DHCP client cannot broadcast directly to the DHCP server because it is separated from that DHCP server by network routing elements. In this case, the DHCP relay agent on the router closest to DHCP client receives a broadcast to port 67 and then forwards the DHCP client's packet on to all DHCP server for which it is configured. In this way, the DHCP client can broadcast locally and still make contact with one or more DHCP servers.

A problem arises with the exchange of messages described above in circumstances in which the DHCP client and the DHCP servers cannot communicate directly. In such circumstances an intermediate device, such as a router, prevents direct communication between the DHCP client and the DHCP server. If either the DHCP client or DHCP server wishes to send information to the other, the sender directs the information in a message to the intermediate device and the intermediate device determines that the information is appropriate for sending to the other or not. In some circumstances, the intermediate device may alter the information in the original message, such as by adding to or deleting from the information in the original message, and send the altered message to the other. As used herein, when an intermediate device prevents direct communication, or receives and reviews information in a message in order to determine whether to forward the message, or alters information in the message, or performs any combination of these actions, the intermediate device is said to filter the communication. An example circumstance in which an intermediate device filters communications among hosts is when the intermediate device enforces some security policy, such as for a firewall. In some circumstances, hardware problems on a wire, interface, or intermediate device can lead to special processing by another intermediate device that constitutes filtering as used herein. Also, an intermediate device filters traffic when a host is on a virtual private network. In virtual private networks, routers are configured to communicate traffic between certain network addresses only when the traffic is encrypted at the intermediate device that routes the traffic onto a public network such as the Internet. If the DHCP server host is not among the certain network addresses, the intermediate device prevents direct traffic.

In circumstances in which an intermediate device filters the communications, the intermediate device prevents the DHCP renewal message sent from a DHCP client to the particular DHCP server that provided the original lease. With renewal messages blocked, clients are forced into risking the validity of their configuration information. The client is routinely forced to rely on use of re-binding requests to carry out renewal in the last hours of the lease time, although the re-binding was designed only for unusual circumstances. If the DHCP servers are off-line for maintenance or for updating by the system administrator at the time a re-binding request is sent, or out of available IP addresses, the client will lose its IP address and be unable to maintain or establish communication with other hosts on the networks until a new IP address is obtained.

If a relay agent is properly configured, the initial DHCP request of a client is not affected, because the initial request is a broadcast not directed to a particular DHCP server. Initial requests normally are issued to a well-known port number, most often "67." The intermediate device receives the broadcast, determines the value of the port from the message, recognizes it as a DHCP message if the port value is 67, and invokes the DHCP relay agent to handle the message. If the system administrator has made an exception for DHCP messages, e.g., allowing a host behind the firewall or on the VPN to use the local DHCP servers, the relay agent sends the message to the one or more local DHCP servers.

Direct communication messages that indicate a particular network address as a destination address are called unicasts. DCHP relay agents are not configured to check unicasts in which the intermediate device is not the destination, because doing so would severely impede network traffic through the intermediate device. Thus DHCP relay agents do not detect and process renewal requests because the renewal requests are unicasts addressed directly to the DHCP server that provided the configuration information bound to the DHCP client. It is not practical to implement an approach that has the relay agent inspect every unicast passing through the intermediate device to detect DHCP messages; because such a approach would severely impede network performance.

In another approach, the DHCP client could be modified to send renewal requests directly to the intermediate device. However, this approach is not practical because tens of millions of DHCP clients have already been deployed over the last decade without such a modification. It would be expensive and take many years to even replace a significant fraction of the deployed DHCP clients. In addition, a modification to the DHCP standard, as embodied in Internet Requests for Comment (RFCs), would be required. Such a change to the DHCP standard is not likely to be accepted, or if it is accepted, it would not be implemented quickly.

Based on the foregoing, there is a clear need for techniques that dynamically assign network addresses when communications between a client host and a server host are filtered by an intermediate network device, without modifying the client process.

SUMMARY OF THE INVENTION

The foregoing needs, and other needs and objects that will become apparent from the following description, are achieved in the present invention, which comprises, in one aspect, a method for providing leased network addresses for a host from a server executing on a server device. An intermediate device can intercept and act on communications between the host and the server. A request is received from the host, through the intermediate device, to provide for a leased network address for the host. A response is generated for the host by the server. The response offers a leased network address for a particular period of time, and also includes a network address of the intermediate device in a portion of the response normally designated for indicating a network address of the server for use in subsequent communication from the host to the server. The response is sent to the intermediate device.

According to another aspect of the invention, a method for providing leased network addresses for a host from a server executing on a server device includes receiving from the host a first request directed to an intermediate device for renewal of a leased network address. The intermediate device filters communications between the host and the server device. The request is sent to the server device from the intermediate device. By providing the address of the intermediate device in the portion of the response designated for the address used in subsequent communications, the server causes the client to send renewal requests to the intermediate device so that the relay process can properly operate on the request. This change is accomplished without modifying the client process.

Thus, the first communication from the client to the server is broadcast, either directly or through a DHCP relay agent. When the broadcast occurs through a DHCP relay agent, the client does not know the IP address of the server to which it is making a request. The server tells the client the address of the server in the response to the client's initial request. The client places this address into all future broadcasts which are directed to that server, and the server uses such address to decide whether the broadcast is directed at the server or not. The client also uses the address of the server as the destination of the unicast renewal message.

The invention involves having the server place the IP address of the client's local relay agent into the location where the server tells the client the server's IP address. In this way, the client will unicast to the local DHCP relay agent instead of the DHCP server when it attempts to unicast the renewal message. Also, the server uses the value in future broadcasts from the client to determine whether the broadcasts are directed to it.

In other aspects, the invention encompasses an apparatus, a computer apparatus, and a computer readable medium, including a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a flowchart that illustrates one embodiment of a method at a server for providing a leased network address;

DETAILED DESCRIPTION OF THE PREFERRED EMBODIMENT

A method and apparatus for providing leased network addresses is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate dynamic host configuration in an example context, embodiments of the invention are described in the context of a virtual private network that prevents direct communication between a client of the dynamic host configuration service and the server that provides dynamic host configuration service.

However, embodiments are not limited to this context. Other embodiments involve other network architectures that prevent direct communication between a client and server, such as a network with a security policy that has a relay agent at an intermediate device function as a firewall, a physical blockage that requires special routing by a relay agent, and use of overlapping address spaces in multiple local networks that have a relay agent add information to discriminate among the local networks, among others.

Structural Overview

Figure 1:
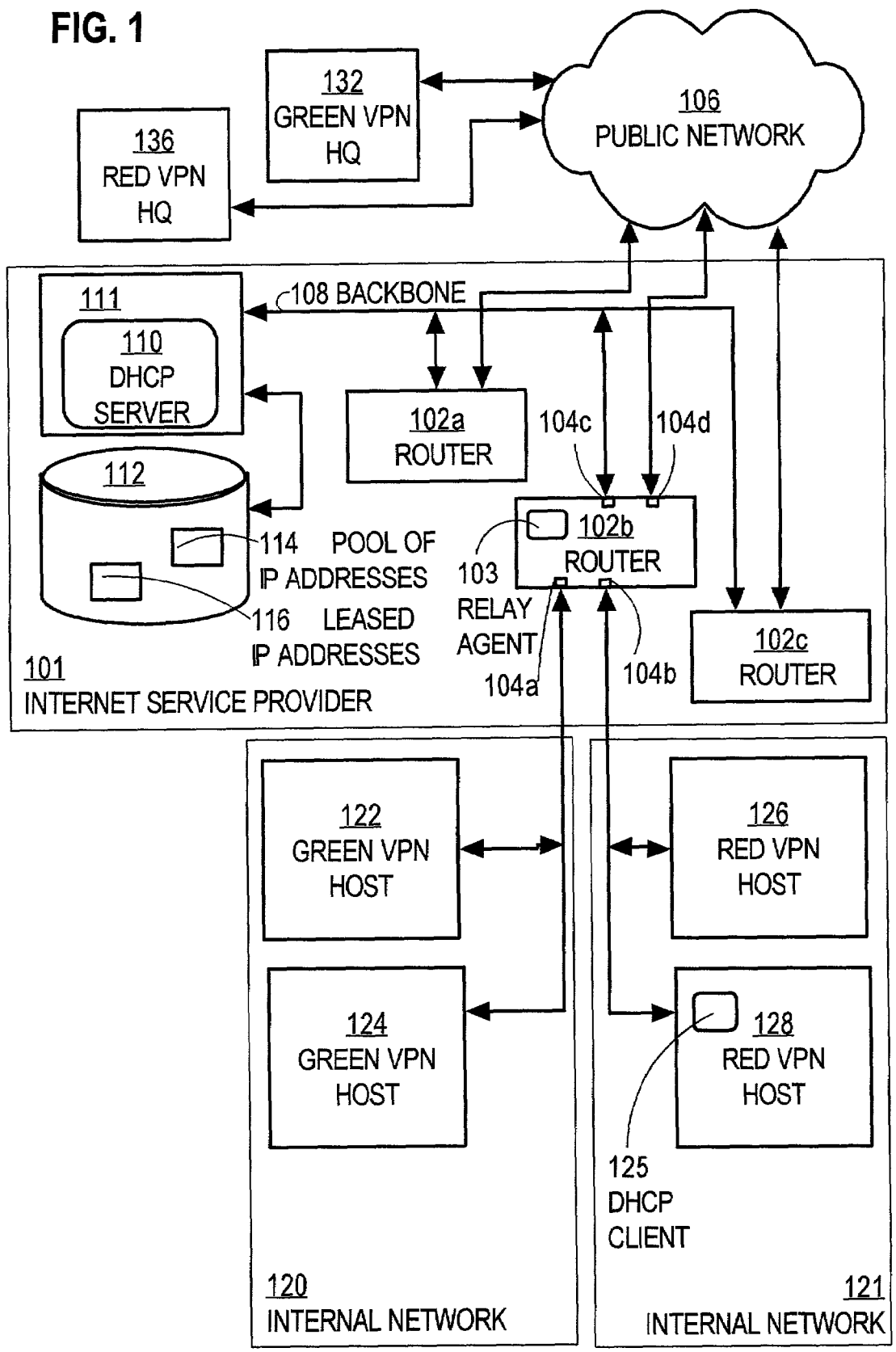
FIG. 1 is a block diagram that illustrates a network in which an intermediate device filters communications between hosts on a local network and a dynamic host configuration server, according to an embodiment.

FIG. 1 is a block diagram that illustrates a network in which an intermediate device filters communications between hosts on a local network and a dynamic host configuration server, according to an embodiment.

According to the illustrated embodiment, an Internet service provider (ISP) 101 maintains a plurality of routers 102a, 102b, 102c, collectively referenced as routers 102, for accepting traffic from one or more local networks, such as internal networks 120, 121, and for placing that traffic onto a public network 106, such as the Internet. Traffic comprises the flow of one or more data packets over a network. Each router has multiple interfaces for physical connections to other devices or networks of devices. For example, router 102b includes four interfaces 104a, 104b, 104c, 104d, among others.

ISP 101 provides at least one dynamic host configuration protocol (DHCP) server 110 executing on a server device 111 that is connected to all the routers through a backbone connection 108. The server device 111 is connected to a persistent storage device 112 including a database having data structures 114, 116. Data structure 114 stores a pool of Internet protocol (IP) logical network addresses (IP addresses) available for binding to a host with a DHCP client. Data structure 116 stores information about particular configuration data, including particular IP addresses, bound to particular hosts by the DHCP server in response to requests from DHCP clients on those hosts.

The ISP 101 provides a virtual private network (VPN) for one or more customers of the ISP. In a VPN all data packets transferred over the public network 106 are encrypted. Routers 102 that are participating in a particular VPN can forward packets only to devices having IP addresses that fall within the namespace or number space of IP addresses defined as the VPN. Data packets received on an interface associated with a particular VPN are forwarded only if the destination address is among the set of IP addresses of the VPN.

For example, interface 104a on router 102b is associated with a particular VPN designated here as the green VPN. Data packets received on interface 104a are forwarded only if the destination IP address is within the VPN, e.g., having a destination address identifying host 132, the headquarters (HQ) for the green VPN. Data packets arriving on interface 104a with a destination IP address not within the VPN address range are not transmitted by the VPN process on router 102b. Thus, in effect, a router executing a VPN process filters communications from hosts on the green VPN by preventing direct communication to a DHCP server 110 on device 111. The DHCP server device 111 is connected to the router 102b through backbone connection 108 and router interface 104c. Data packets that have a destination IP address of the green HQ host 132 are encrypted and sent to the public network 106 through interface 104d on router 102b. A router connecting green HQ host 132 to the public network 106 decrypts the data packet and passes the data packet to the host 132.

Similarly, interface 104b on router 102b is associated with a second VPN designated here as the red VPN. Data packets received on interface 104b may be forwarded if the destination IP address identifies host 136, the headquarters (HQ) for the red VPN.

FIG. 1 also illustrates hosts 122, 124, 126, 128 on internal networks 120, 121 that are connected directly to router 102b of ISP 101. Hosts 122 and 124 are on an internal network 120 in the green VPN and are connected to interface 104a of router 102b. Hosts 126 and 128 are on an internal network 121 in the red VPN and are connected to interface 104b of router 102b. The ISP provides configuration information for hosts 122, 124, 126, 128 using DHCP server 110, as described in more detail below with reference to FIG. 3.

A DHCP client process executes on each host of the internal networks. For example, DHCP client 125 runs on host 128 on the red VPN. A relay agent runs on the routers 102 to facilitate communication between the DHCP clients and DHCP servers. For example, relay agent 103 on router 102b facilitates communication between DHCP client 125 on host 128 and DHCP server 110 on device 111.

Figure 2:
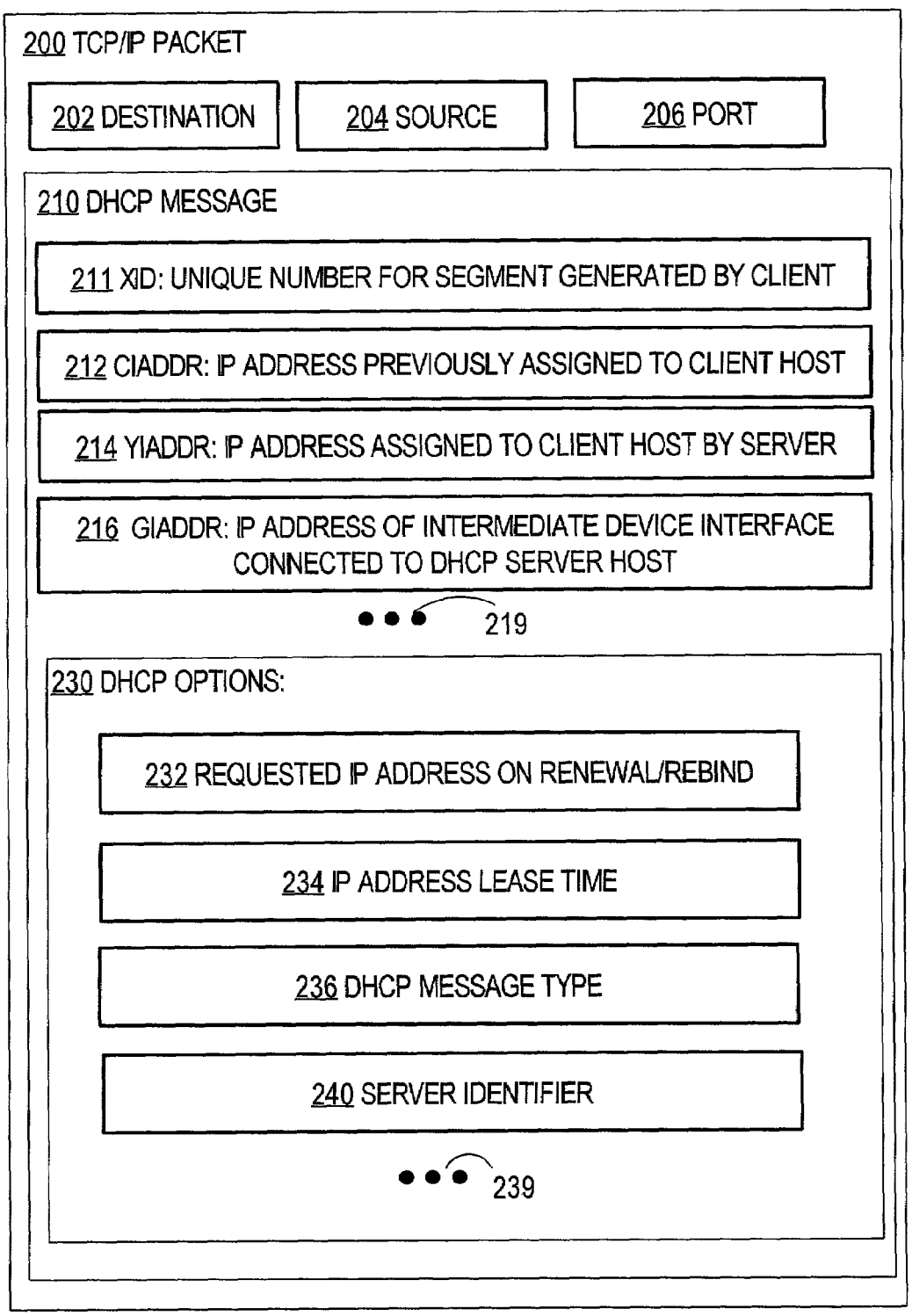
FIG. 2 is a block diagram that illustrates a packet including a message used to communicate with a dynamic host configuration server.

FIG. 2 is a block diagram that illustrates a packet 200 including a message used to communicate with a dynamic host configuration server. DHCP messages are included in transport control protocol IP (TCP/IP) data packets. TCP/IP packets include a destination field 202, a source field 204 and a port field 206. The destination field holds data indicating the IP address of the intermediate device or host that is to receive the TCP/IP packet. Routers efficiently transmit TCP/IP packets using hardware configured to interpret the destination address in destination field 202. The source field holds data indicating the IP address of the intermediate device or host that sent the TCP/IP packet. The port field holds data indicating the service requested on the destination device, so that the destination device provides the packet to the appropriate server process executing on the destination device.

The TCP/IP packet includes payload data that is not used by TCP/IP to transfer packets. The illustrated embodiment includes a DHCP message 210 in the data payload. A DHCP message 210 includes a set of fields used in an earlier protocol for passing IP addresses, and a set of fields in a DHCP options portion 230 of the DHCP message.

The fields of the earlier protocol include the xid field 211, ciaddr field 212, the yiaddr field 214 and the giaddr field 216, among others. The xid field 211 holds a value generated by the DHCP client that a particular client may use to distinguish a reply to one message from a reply to another message. In some embodiments, the value of the xid field 211 is based on the media access control (MAC) address, a unique burned-in address for each network device set according to an agreement among manufacturers of network devices. To enable messages to be distinguished, each client may use a different xid for each message.

The ciaddr field 212 holds a value for an IP address previously assigned to the host of a DHCP client communicating using packet 200, if any. At first the ciaddr field 212 is empty, but in a renewal request and a request for rebinding, a value is included in the ciaddr field 212. The yiaddr field 214 holds a value for an IP address just assigned to the host of a DHCP client communicating using packet 200, if any. At first the yiaddr field 214 is empty, but in some responses, such as an offer response, from the DHCP server a value is included in the yiaddr field 214. The giaddr field 216 holds a value for an IP address of the interface of the intermediate device connected to the server device, which intermediate device is between the server and the client, if any. In the initial message from the DHCP client, the giaddr field 216 is empty, but after a relay agent has processed the request, a value is included in the giaddr field 216. For example, a value for the IP address of interface 104c of router 102b is included in the giaddr field 216.

The fields in the DHCP options portion include the requested-IP-address field 232, the IP-lease-time field 234, the DHCP message-type field 236 and the server-identifier field 240, among others. The requested-IP-address field 232 holds a value for an IP address requested by a DHCP client communicating using packet 200, if any, such as in a rebind message. The client might not request the same IP address that was last assigned, in the ciaddr field 212, but might request a different or earlier assigned IP address. The IP-lease-time field 234 holds a value for a lease time assigned by the server, during which the host of the client may use the address in yiaddr field 214. The DHCP message-type field 236 holds data that indicates the type of message, such as the initial request (a "DHCPDISCOVER" message type) and the renewal request (a "DHCPREQUEST" type), and the response with an offer (an "DHCPOFFER" type), among others.

The server-identifier field 240 is designated by the conventional DHCP standards to hold a value for an IP address to be used by the client as a destination address for sending messages to the server. As stated in RFC 2131, "he 'server identifier' field is used both to identify a DHCP server in a DHCP message and as a destination address from clients to servers." Further, "DHCP clients MUST use the IP address provided in the 'server identifier' option for any unicast requests to the DHCP server." Many DHCP messages are not sent directly (i.e., are not unicast) to the server, but are broadcast, as described in more detail below with reference to FIG. 3. The server fills this field when generating a response offering a set of configuration values for a host, among other situations.

According to the approach herein, the DHCP server inserts an IP address of the intermediate device, instead of the IP address of the DHCP server, into the server-identifier field 240. For example, the DHCP server inserts the IP address of interface 104b of router 102b, instead of the IP address of server device 111, into a DHCP message of message type DHCPOFFER in response to a DHCP message of message type DHCPDISCOVER from DHCP client 125 in host 128.

Functional Overview

Figure 3:
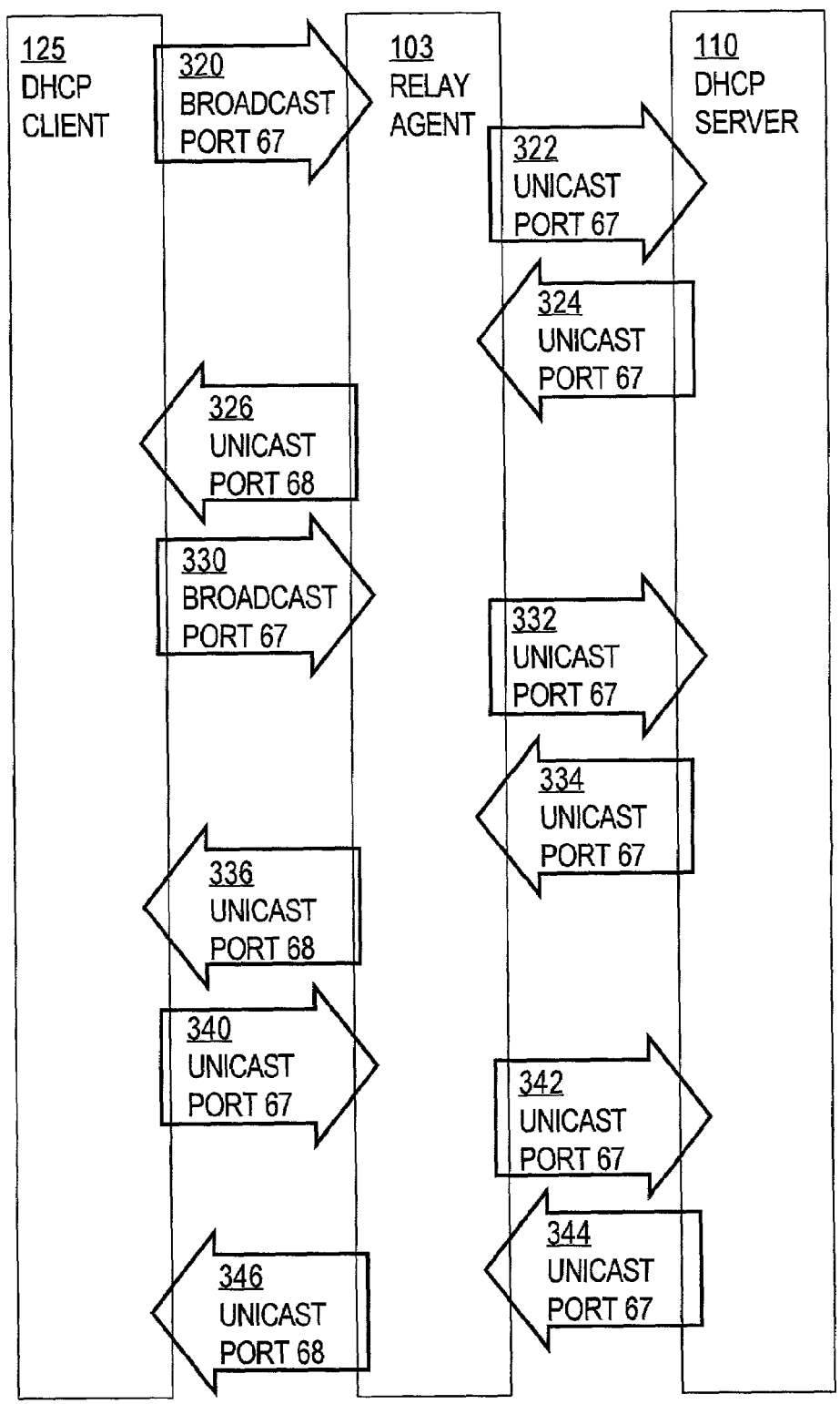
FIG. 3 is a time line diagram that illustrates a sequence of messages passed between a host, an intermediate device and a dynamic host configuration server, according to an embodiment.

FIG. 3 is a time line diagram that illustrates a sequence of messages passed between a host that is a requesting DHCP client, an intermediate device such as a relay agent, and a dynamic host configuration server, according to an embodiment.

Discovery

At time tA, a DHCP request message 320 of type DISCOVER is sent from DHCP client 125 in a broadcast packet. A broadcast is a TCP/IP packet that is passed to every device on a network segment. A network segment consists of all devices not separated by intermediate devices, and the one or more intermediate devices contiguous with those devices. For example, in FIG. 1, hosts 126 and 128 and router 102b constitute one network segment. Similarly DHCP server device 111 and routers 102a, 102b, 102c constitute another network segment.

A broadcast is indicated by a special value in the destination address field 202 of the TCP/IP packet. For example, a hexadecimal value of FFFFFFFF (all ones) indicates a broadcast packet. The DHCP client indicates the message is a DHCP message by including a value in the port indicating dynamic host configuration services, e.g., by setting the port to the value 67. The message includes a value for the xid field 211 that uniquely identifies a particular message from the DHCP client sending the request. Other values such as client-id or, if client-id is absent, chaddr and hardware-type, are used to uniquely identify the client.

The intermediate device in the segment receives the broadcast message. For example, the router 102b receives the message at interface 104b for the red VPN. Because the packet was broadcast to port 67, indicating a DHCP message, and the DHCP relay agent listens on port 67 and reacts to all broadcasts on that port, the DHCP relay agent receives the message.

In some embodiments, the relay agent is configured to send a request only to a DHCP server on the same VPN as is associated with the interface through which the request came. In these embodiments, a DHCP server on the VPN, such as on red HQ host 136, is sent the request by the relay agent. In some embodiments, it is considered preferable to use a DHCP server that is closer (from a network standpoint) to the DHCP client and on a high bandwidth connection. In these embodiments, the relay agent 103 is allowed to send DHCP messages to DHCP server 110 on device 111, under the control of the ISP 101, and connected to router 102*b* by a high bandwidth backbone connection 108. The latter embodiments are illustrated in FIG. 1 and FIG. 3.

The relay agent determines that the DHCP servers on the backbone connection are authorized for the DHCP messages and selects one to receive the request of DISCOVER type. For example, the relay agent selects DHCP server 110 and determines to send the request to device 111. In some embodiments, the request of type DISCOVER is broadcast on the network segment connected to backbone 108 so that the request reaches all DHCP servers on the segment. In the illustrated embodiment the intermediate device filters the messages by reviewing information in order to determine whether to forward the message.

In some embodiments, the relay agent is modified to distinguish requests originating from different interfaces by adding data to the requests sent to the DHCP server. This information is useful in several circumstances. For example, such information is useful in embodiments in which the internal networks 120, 121 use the same IP addresses, called overlapping address spaces. In such embodiments, the DHCP server filters the messages by altering information in the message, e.g., adding data into the message.

Internal or private networks are allowed to use the same network address from a range of addresses TCP/IP has reserved for private networks. Such private addresses are not used for communication outside those private networks, such as on the public network 106 and on the network of ISP 101. Consequently, the same address from the private range can be used by different private networks. For example, if the private range includes the addresses X.Y.Z.000 to X.Y.Z.255, then host 124 on internal network 120 and host 128 on internal network 128 may both use the same private address X.Y.Z.001. A VPN is allowed to use addresses for its devices from the range of addresses for private networks. Thus internal networks 120, 121 can use overlapping address spaces. Similarly, the red VPN and the green VPN can use overlapping address spaces.

In embodiments with overlapping address spaces, the modified relay agent adds data to the DHCP requests that distinguishes the private or internal networks. The DHCP standard includes parameters that can be set by the relay agent, such as the giaddr field 216. Also, the DHCP standard allows for optional parameters to be appended in the option portion of the DHCP message. For example, in one embodiment, the relay agent adds an IP address of the interface connected to the local network associated with the host that sent the request, such as the IP address of interface 104*b* for requests received from the local red VPN hosts 126, 128. For purposes of illustration, the value of the IP address of interface 104*b* is assumed to be A.B.C.004. In an example of another embodiment, the relay agent adds a VPN identifier (VPN ID) for the VPN associated with the host that sent the message. For purposes of illustration, the value of the VPN ID is assumed to be red. In other embodiments, other data can be inserted, alone or in combination with the IP address of the interface and the VPN ID.

At time tB, a DHCP request message 322 of type DISCOVER is unicast from DHCP relay agent 103 to the DHCP server 110 selected by the relay agent. The DHCP message is identified as such by setting the port to the value 67.

At the DHCP server 110, a response 324 of type OFFER is generated based on the contents of message 322 and the contents of data structures 114 and 116. An IP address is selected from the pool of addresses in data structure 114, if any addresses are available. In the case of overlapping address spaces, the pool of available addresses is based on the additional data inserted into the request by the relay agent. For example, the pool of available addresses depends on the VPN identification in one embodiment, and the IP address of the interface connected to the host in another embodiment.

A lease time is generated based on the requested time and the resources available, in any manner known in the art when the server is implemented. The lease time is inserted into the response. The data from the relay agent distinguishing one private network from another is included somewhere in the response.

The server also inserts for the server-identifier field 240 a value of the IP address of the intermediate device. For example, the server inserts into the server-identifier field 240 a value of the IP address of the interface 104*b* obtained from the data added to the options portion by the relay agent as described above for one embodiment.

At time tC, the message 324 is unicast back to the relay agent 103 that sent the request, with the port set to 67 to indicate it is a DHCP message. The message includes the IP address for the host of the client that originated the request. For example the value of yiaddr field 214 is X.Y.Z.001. The message includes the IP address of the intermediate device; for example the value of the server-identifier field 240 is A.B.C.004.

In some embodiments, the relay agent 103 determines that DHCP messages from DHCP server 110 are authorized for sending to the VPN connected to interface having IP address A.B.C.004. In some embodiments, the relay agent 103 determines the interface through which to send the response based on the data included in message 324. For example, the relay agent determines to send the response on interface A.B.C.004. The relay agent generates the response message 326 based on the response message 324, and sets the port to 68, indicating a DHCP message for receipt by a client.

At time tD, message 326 is sent. For example, message 326 is sent through interface 104*b*. In some embodiments, the message is broadcast on the network segment and received by all clients. The port of 68 allows the hosts to recognize the message as a response to be reviewed and not a request from a client to be ignored. The message includes a value of the xid field 211. The appearance of information about client 125 in the message allows DHCP client 125 on host 128 to recognize the response is for client 125, and the xid value enables client 125 to determine that the message is a response to an existing or outstanding request. The physical address of host 128 with client 125 appears in the message 326 in the "chaddr" and "hardware-type" values.

Acceptance

At time tE, the client notifies all offering DHCP servers that the offer from DHCP server 110 is accepted by broadcasting DHCP message 330 on port 67.

The relay agent receives the broadcast and generates message 332 as described above with respect to generating message 322. At time tF, the relay agent unicasts DHCP message 332 to DHCP server 110.

Upon receipt of the request accepting the offered IP address and configuration information, the DHCP server 110 binds the configuration information to the host 128 of the client and records the binding in the data structure 116 of leased IP addresses. The DHCP sever 110 resolves ambiguities caused by overlapping address spaces as described above with respect to generating message 324. The DHCP server 110 then generates an acknowledgement DHCP message 334 and unicasts it to the relay agent 103 with port set to 67 at time tG.

The relay agent receives the unicast and generates message 336 as described above with respect to generating message 326. At time tH, the relay agent unicasts DHCP message 336, with port set to 68, to DHCP client 125. In one alternative, relay agent records the association between the physical location on the network segment and the new IP address assigned to the host. Alternatively, the relay agent is stateless and does not record such association. In either alternative the association may be recorded in or found in the ARP table.

Renewal

At time tI, which is equivalent to the renewal request time t1 described in the Background section hereof, a DHCP request message 340 for renewal of the lease with port set to 67 is sent from DHCP client 125 in a unicast packet, unlike messages 320 and 330 that are broadcast. In the conventional DHCP system, the message is unicast to the IP address of the DHCP server 110, but if the message 340 is unicast with a destination IP address of the DHCP server 110, the router 102b will not forward the message because the IP address is outside the defined address range of the VPN. DHCP server 110 does not receive the renewal request and the lease is not renewed. In the risky final moments of the lease, the DHCP client issues a desperate broadcast request for a new binding from any of the DHCP servers.

However, the conventional client is configured to unicast to the IP address in the server-identifier field 240 in the initial offer. According to the embodiments illustrated, the field 240 now contains the IP address of the intermediate device, not the DHCP server. Thus the renewal request is unicast to the intermediate device. For example, the renewal message 340 is unicast to A.B.C.004, the IP address of the interface 104b on the router 102b. The VPN process does not prevent this transfer.

The relay agent at the intermediate device then processes the message as described above with respect to generating message 322.

In embodiments without a VPN, a VPN process does not prevent a unicast. However, in embodiments with overlapping IP address space, another failure occurs. In such embodiments, the relay agent on the intermediate device does not process the message in the unicast. That is, the intermediate device is not afforded the opportunity to filter the communication. Thus the message arrives at the DHCP server without the data added by the relay agent. The DHCP server cannot guarantee that a renewal request originated with a particular one of two or more hosts on different internal or private networks that use the same IP address. For example, a renewal request from host 128 having IP address X.Y.Z.001 can not be distinguished from a renewal request from host 124 having the same IP address X.Y.Z.001. Even if the server attempts to respond, the response arrives at the relay agent with an address that appears on more than one network. The relay agent cannot determine which interface to send the response through.

According to the embodiments illustrated, the renewal request is unicast to the intermediate device. The intermediate device performs the filtering appropriate for DHCP messages on port 67, as described above with respect to generating message 322. For example, relay agent 103 on router 102b adds the IP address of the interface on which the renewal request is received, A.B.C.004, to the relay agent option field. The modified renewal request 342 is then unicast to the DHCP server device 111 on port 67 at time tJ.

The DHCP server updates the lease in the data structure 116 and generates an acknowledgement response message 344 of type DHCPACK. The acknowledgement includes the IP address of the intermediate device in the relay agent option field. At time tK the DHCP server unicasts message 344, with port set to 67, to the relay agent.

The relay agent receives the unicast and generates message 346 as described above with respect to generating message 326. The relay agent uses the information in the relay agent option field to determine on which interface to send the response to the host. The relay agent performs any filtering involved with the communication. At time tL, the relay agent unicasts DHCP message 346, with port set to 68, to DHCP client 125, granting the renewal request.

Method at the Server

FIG. 4A is a flowchart that illustrates one embodiment 400 of a method at a server for providing a leased network address.

In step 410, the server receives, from an intermediate device, a request for a leased network address for a host. The request includes data from the intermediate device associated with the host. For example, DHCP server 110 receives DHCP message 322 of type DHCPDISCOVERY. In one embodiment, the message 322 includes the IP address A.B.C.004 of interface 104b of router 102b in a relay agent option in the DHCP options portion of the DHCP message. In some embodiments the IP address of interface 104c of router 102b is inserted into the giaddr field 216.

In step 430, the server generates a response message. For example, DHCP server 110 generates a DHCP message of type DHCPOFFER. The response includes a leased network address and a lease time. The portion of the message designated for indicating a network address for subsequent communication from the host to the server is filled by data indicating a value for the network address of the intermediate device. For example, the value A.B.C.004 of the interface 104b of router 102b in the relay agent option is inserted into the server-identifier field 240. In some embodiments, data from the intermediate device is added to the message. For example, a VPN ID is added in a second relay agent option in the DHCP options portion.

In step 450, the response generated in step 430 for the host is sent to the intermediate device. For example, message 324 is unicast to the IP address in giaddr field 216 of interface 104c of router 102b for host 128.

Figure 4B:
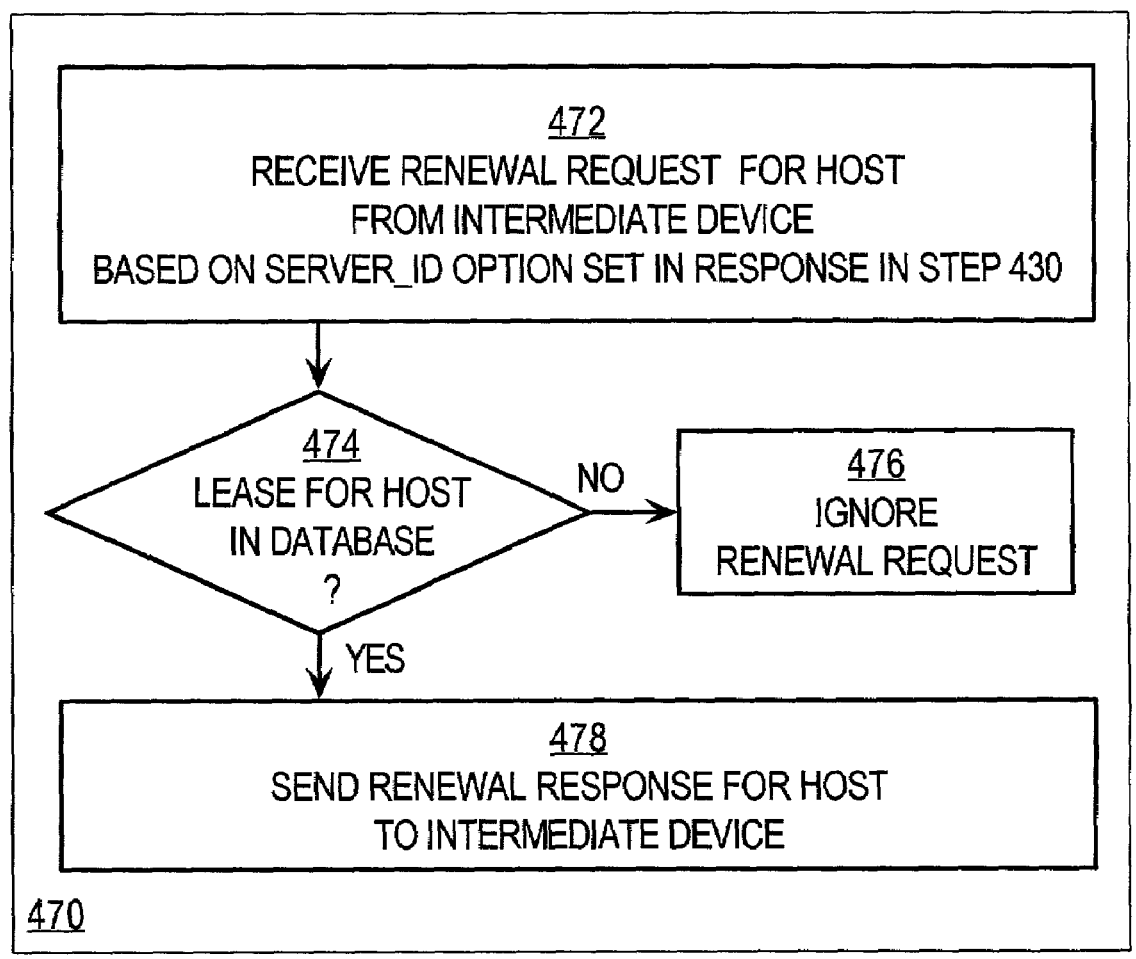
FIG. 4B is a flowchart that illustrates one embodiment of a method at a server for renewing a leased network address.

FIG. 4B is a flowchart that illustrates one embodiment 470 of a method at a server for renewing a leased network address. In some embodiments, the relay agent broadcasts the DHCP messages to all DHCP servers on the network segment of the backbone connection 108. The DHCP servers that did not grant a lease do not respond to a request to renew the lease.

In step 472 a renewal message for the host is received from the intermediate device. The renewal is received from the intermediate device, not the client on the host having the lease, because the IP address of the intermediate device was placed into the server-identifier filed 240 in step 430. For example, DHCP server 110 receives message 342 from router 102b based on the server-identifier being set to A.B.C.004 of the interface 104b of the router 102b.

In step 474 it is determined whether the server has data indicating the lease of the renewal request. For example, it is determined whether DHCP server 110 has in data structure 136 data indicating the IP address of the requesting client.

If the server does not have such data, control passes to step 476 to ignore the request. If the server does have such data, indicating the current server is the server that granted the lease, then control passes to step 478.

In step 478, the renewal request for the host is sent to the intermediate device. For example, DHCP message 344 is unicast to interface 104c of router 102b with port 67, for processing by the relay agent 103. The relay agent grants the renewal to the host.

Method at the Relay Agent

In certain embodiments, no change in the processing steps of the relay agent, such as the DHCP relay agent 103, is required. The usual processing by the relay agent will effect a different result, according to embodiments, because when the relay agent receives a DHCP message including a renewal request, it will be processed as a DHCP request and passed to authorized DHCP servers, according to usual processing at the relay agent. The servers will receive the request for renewal and handle it according to the embodiments described above with reference to FIG. 4B.

In some embodiments, the steps performed by the relay are changed, such as by adding step 530, described below with reference to FIG. 5A.

Figure 5A:
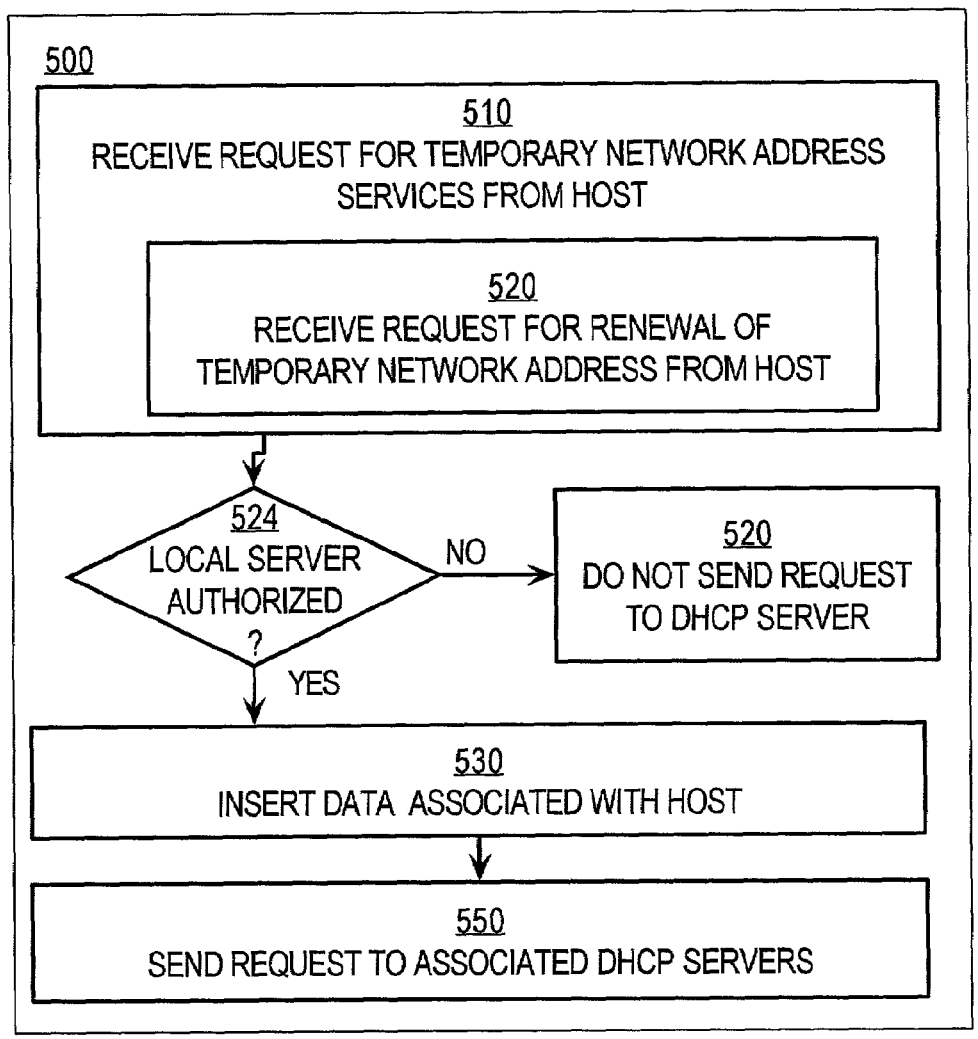
FIG. 5A is a flowchart that illustrates one embodiment of a method at an intermediate device for processing a request for a leased network address.

FIG. 5A is a flowchart that illustrates one embodiment 500 of a method at an intermediate device for processing a request for a leased network address.

In step 510 a request is received at the intermediate device from a host for leased address services. For example, messages 320 and 330 with port set to 67 are broadcast on the network segment connected to interface 104b of router 102b. Step 510 includes step 520, in which a request for renewal of a leased network address is received from the host at the intermediate device. For example, message 340 for renewal with port set to 67 is unicast to the router 102b by the DHCP client 125 on host 128. Step 520 does not occur in conventional DHCP systems.

In step 524, the relay agent on the intermediate device determines whether the servers connected to the intermediate device are authorized to provide leased network address services. For example, relay agent 103 determines that DHCP server 110 on device 111 is authorized to receive DHCP messages from interface 104b of router 102b.

If the local server is not authorized to provide leased network address services, then the request is not sent to the server. In some embodiments the request is sent to a server on the same VPN, which is authorized to receive DHCP messages.

If the local server is authorized to provide leased network address services, then data associated with the host whose client originated the request are inserted into the message, in step 530. For example the VPN ID of red is inserted into the message 322, 332, 342. In another example, the IP address of the interface 104b on the router 102b that is connected to the host 128 of client 125 is inserted into the message 322, 332, 342. In step 550, the filtered request message is sent to the server. For example DHCP request messages 322, 332, 342 are sent to server 110 on device 111.

Figure 5B:
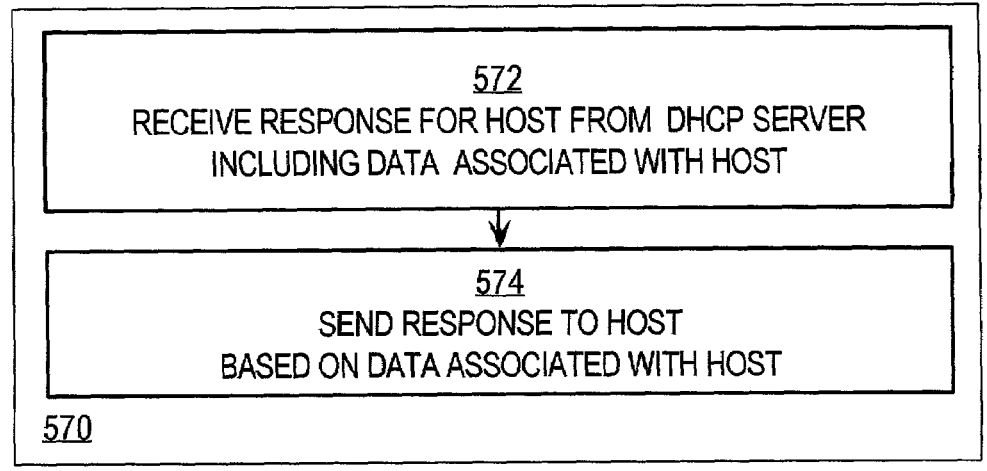
FIG. 5B is a flowchart that illustrates one embodiment of a method at an intermediate device for processing a response for a leased network address.

FIG. 5B is a flowchart that illustrates one embodiment 570 of a method at an intermediate device for possessing a response from a server for a leased network address for a client.

In step 572 a response message is received from a server for a host. The message includes data associated with the host inserted during step 530 above. For example, DHCP messages 324, 334, 344 are received from DHCP server 110 on device 111. The messages include data inserted in step 530 above. For example, messages 324, 334, 344 include VPN ID of red. In another example, messages 324, 334, 344 include the IP address of the interface 104b on the router 102b that is connected to the host 128 of client 125.

In step 574, a response is sent to the host based on data associated with the host. For example, message 346 is sent to client 125 on host 128 based on the VPN ID value of red and the internal network address X.Y.Z.001. For example, messages 326, 336 are sent to client 125 on host 128 based on the VPN ID value of red and the value of the client-id or hardware address. In other embodiments, message 346 is sent to client 125 on host 128 based on the public IP address A.B.C.004 of interface 104b of router 102b and the internal network address X.Y.Z.001. In yet other embodiments, messages 326, 336 are sent to client 125 on host 128 based on the public IP address A.B.C.004 of interface 104b of router 102b and the value of the client-id or hardware address.

Method at the Client

Embodiments do not involve a change in the processing steps of the client, such as the DHCP client. The usual processing by the client will effect a different result, according to embodiments of the invention, because when the client sends a renewal request to the network address in the server-identifier field 240, according to usual processing at the client, the request will be sent to the network address of the intermediate device that is the value of the server ID parameter. The relay agent at the intermediate device will receive the request for renewal and handle it properly, as described above with reference to FIG. 5A.

Making no changes to the client is an advantage of the techniques disclosed because tens of millions of DHCP clients have already been deployed over the last decade. It will be expensive and take many years to even replace a significant fraction of the deployed DHCP clients. Thus it is highly desirable to make no changes to the client processes.

Hardware Overview

Figure 6:
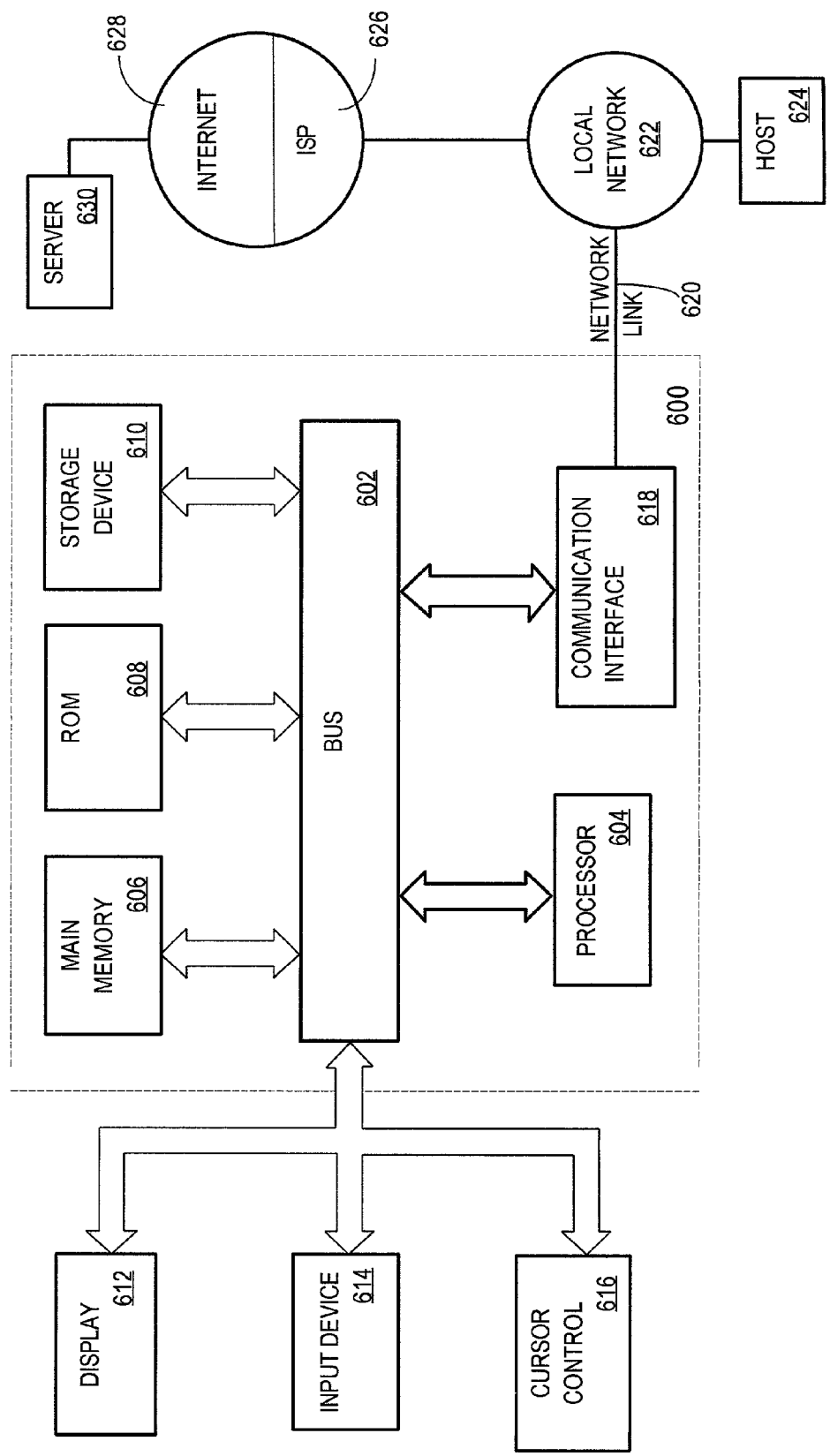
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing leased network addresses. According to one embodiment of the invention, a server for leased network address services is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a DHCP server as described herein.

The received code may be executed by processor 604 as it is received, and/or stored in storage device 610, or other non-volatile storage for later execution. In this manner, computer system 600 may obtain application code in the form of a carrier wave.

EXTENSIONS AND ALTERNATIVAES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing leased network addresses for a host from a server, wherein communications between the host and the server device are filtered by an intermediate device, the method comprising the computer-implemented steps of:
   receiving a request for a leased network address for the host from the intermediate device;
   generating a response for the host offering a leased network address for a particular period of time, including inserting first data comprising a network address of the intermediate device into a portion of the response designated for indicating a network address of the server for subsequent communication from the host to the server;
   sending the response to the host through the intermediate device; and
   wherein the intermediate device forwards the request including second data indicating the request is directed to the intermediate device and including third data indicating services related to providing leased network addresses.

2. A method as recited in claim 1, further comprising the step of formatting the response according to a dynamic host configuration protocol (DHCP).

3. A method as recited in claim 2, wherein the portion of the response is a server identification field in a set of optional fields for the DHCP.

4. A method as recited in claim 1, wherein the request is formatted according to a dynamic host configuration protocol (DHCP).

5. A method as recited in claim 1, wherein the intermediate device prevents transmission of a particular request from the host to a particular destination network address indicated by the particular request unless the particular network address is one of a set of one or more network addresses stored by the intermediate device.

6. A method as recited in claim 5, wherein a network address of the server device is not among the set of one or more network addresses stored by the intermediate device.

7. A method as recited in claim 1, wherein the second data comprises data that indicates a broadcast from the host.

8. A method as recited in claim 1, wherein the second data comprises data that indicates a destination network address that is the network address of the intermediate device.

9. A method as recited in claim 1, wherein the third data indicates a port number associated with services related to providing leased network addresses.

10. A method as recited in claim 1, wherein the intermediate device is configured as a relay agent for a dynamic host configuration protocol (DHCP).

11. A method as recited in claim 1, further comprising the steps of:
   sending a second request for extending the particular period of time for the host to the intermediate device, based on the first data; and
   receiving the second request for extending the particular time for the host from the intermediate device.

12. The method as recited in claim 1, wherein the intermediate device filters requests from the host by not forwarding a particular request to the server device unless the particular request indicates a particular port associated with services related to leased network addresses.

13. A method as recited in claim 1, wherein the intermediate device filters requests from the host by redirecting a particular request to the server device.

14. A method as recited in claim 1, wherein the intermediate device filters requests from the host by inserting second data into a portion of the request designated for a relay agent.

15. The method as recited in claim 14, wherein the second data indicates an interface of the intermediate device connected to the host.

16. The method as recited in claim 14, wherein the second data indicates a particular virtual private network to which the host belongs.

17. A computer-readable medium carrying one or more sequences of instructions for providing leased network addresses for a host from a server, wherein communications between the host and the server are filtered by an intermediate device, which instructions, when executed by one or more processors, cause the one or more processors to carry out the steps of:
   receiving a request for a leased network address for the host from the intermediate device;
   generating a response for the host offering a leased network address for a particular period of time, including inserting first data comprising a network address of the intermediate device into a portion of the response designated for indicating a network address of the server for subsequent communication from the host to the server;
   sending the response to the host through the intermediate device; and
   wherein the intermediate device forwards the request including second data indicating the request is directed to the intermediate device and including third data indicating services related to providing leased network addresses.

18. An apparatus for providing leased network addresses for a host from a server, wherein communications between the host and the server are filtered by an intermediate device, comprising:
   means for receiving a request for a leased network address for the host from the intermediate device;
   means for generating a response for the host offering a leased network address for a particular period of time, including inserting first data comprising a network address of the intermediate device into a portion of the response designated for indicating a network address of the server for subsequent communication from the host to the server;
   means for sending the response to the host through the intermediate device; and
   wherein the intermediate device forwards the request including second data indicating the request is directed to the intermediate device and including third data indicating services related to providing leased network addresses.

19. An apparatus as recited in claim 18, further comprising means for formatting the response according to a dynamic host configuration protocol (DHCP).

20. An apparatus as recited in claim 19, wherein the portion of the response is a server identification field in a set of optional fields for the DHCP.

21. An apparatus as recited in claim 18, wherein the request is formatted according to a dynamic host configuration protocol (DHCP).

22. An apparatus as recited in claim 18, wherein the intermediate device prevents transmission of a particular request from the host to a particular destination network address indicated by the particular request unless the particular network address is one of a set of one or more network addresses stored by the intermediate device.

23. An apparatus as recited in claim 22, wherein a network address of the server device is not among the set of one or more network addresses stored by the intermediate device.

24. An apparatus for providing leased network addresses for a host from a server executing on a server device, wherein communications between the host and the server device are filtered by an intermediate device, comprising:
   a network interface that is coupled to the intermediate device for receiving a first request for a leased network address for the host from the intermediate device;
   a processor; and
   one or more stored sequences of instructions which, when executed by the processor, cause the processor to carry out the steps of:
      generating a response for the host offering a leased network address for a particular period of time, including inserting first data comprising a network address of the intermediate device into a portion of the response designated for indicating a network address of the server for subsequent communication from the host to the server;
      sending the response to the host through the intermediate device; and
      wherein the intermediate device forwards the request including second data indicating the request is directed to the intermediate device and including third data indicating services related to providing leased network addresses.

25. An apparatus as recited in claim 24, further comprising means for formatting the response according to a dynamic host configuration protocol (DHCP).

26. An apparatus as recited in claim 24, wherein the portion of the response is a server identification field in a set of optional fields for the DHCP.

27. An apparatus as recited in claim 24, wherein the request is formatted according to a dynamic host configuration protocol (DHCP).

28. An apparatus as recited in claim 24, wherein the intermediate device prevents transmission of a particular request from the host to a particular destination network address indicated by the particular request unless the particular network address is one of a set of one or more network addresses stored by the intermediate device.

29. An apparatus as recited in claim 28, wherein a network address of the server device is not among the set of one or more network addresses stored by the intermediate device.

* * * * *